United States Patent [19]

Norimatsu

[11] Patent Number: 5,467,392
[45] Date of Patent: Nov. 14, 1995

[54] DIALING APPARATUS FOR DISPLAYING STORED CHARACTER WITH REDUCED KEY OPERATIONS

[75] Inventor: Noriko Norimatsu, Tokyo, Japan

[73] Assignee: NEC Corporation, Tokyo, Japan

[21] Appl. No.: 51,732

[22] Filed: Apr. 23, 1993

[30] Foreign Application Priority Data

Apr. 23, 1992 [JP] Japan ..................... 4-104449

[51] Int. Cl.$^6$ ........................ H04M 1/27
[52] U.S. Cl. ............... 379/354; 379/355; 379/356; 379/357
[58] Field of Search ............... 379/354, 355, 379/356, 357

[56] References Cited

U.S. PATENT DOCUMENTS

| | | | |
|---|---|---|---|
| 4,709,387 | 11/1987 | Masuda ........................... | 379/354 |
| 4,800,582 | 1/1989 | D'Agosto, III et al. .......... | 379/355 |
| 4,841,567 | 6/1989 | Masuda et al. ................. | 379/355 |
| 5,119,417 | 6/1992 | Suzuki et al. .................. | 379/354 |
| 5,216,709 | 6/1993 | Wen et al. ...................... | 379/355 |

FOREIGN PATENT DOCUMENTS

| | | |
|---|---|---|
| 0206391 | 12/1986 | European Pat. Off. . |
| 0401849 | 12/1990 | European Pat. Off. . |
| 0491516 | 6/1992 | European Pat. Off. . |
| 2195867 | 4/1988 | United Kingdom . |

OTHER PUBLICATIONS

Patent Abstracts of Japan, vol. 9, No. 255 (E–349) 12 Oct. 1985.
Patent Abstracts of Japan, vol. 15, No. 433 (P–1271) 5 Nov. 1991.

*Primary Examiner*—Jeffery A. Hofsass
*Assistant Examiner*—Jacques M. Saint-Surin
*Attorney, Agent, or Firm*—Foley & Lardner

[57] ABSTRACT

A dialing apparatus comprises a keypad (21) having digit keys for entering a digit corresponding to a set of characters and a function key (SND). Character strings and corresponding digit strings are stored in a memory (23). In response to a digit from the keypad, a controller (20, 24) makes a search through the memory for detecting each one of characters of the set which corresponds to the digit and detecting character strings each containing the detected character. The detected character strings are then sequentially supplied to a display unit (22) from the memory so that they are displayed one at a time. When the command key is operated, the character string being displayed on the display unit is identified and the digits stored in the memory corresponding to the identified character string are dialed to a switched network.

4 Claims, 4 Drawing Sheets

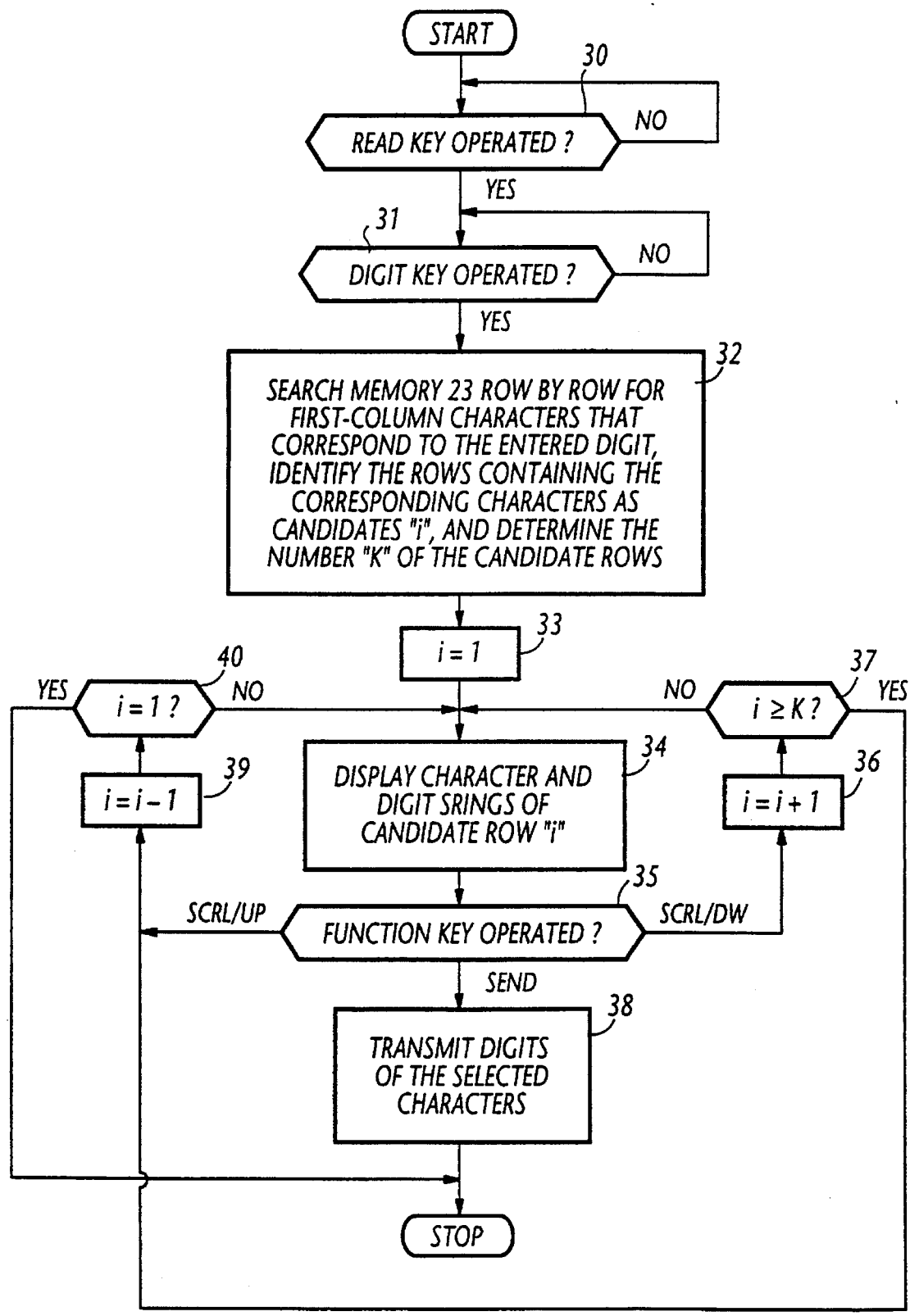

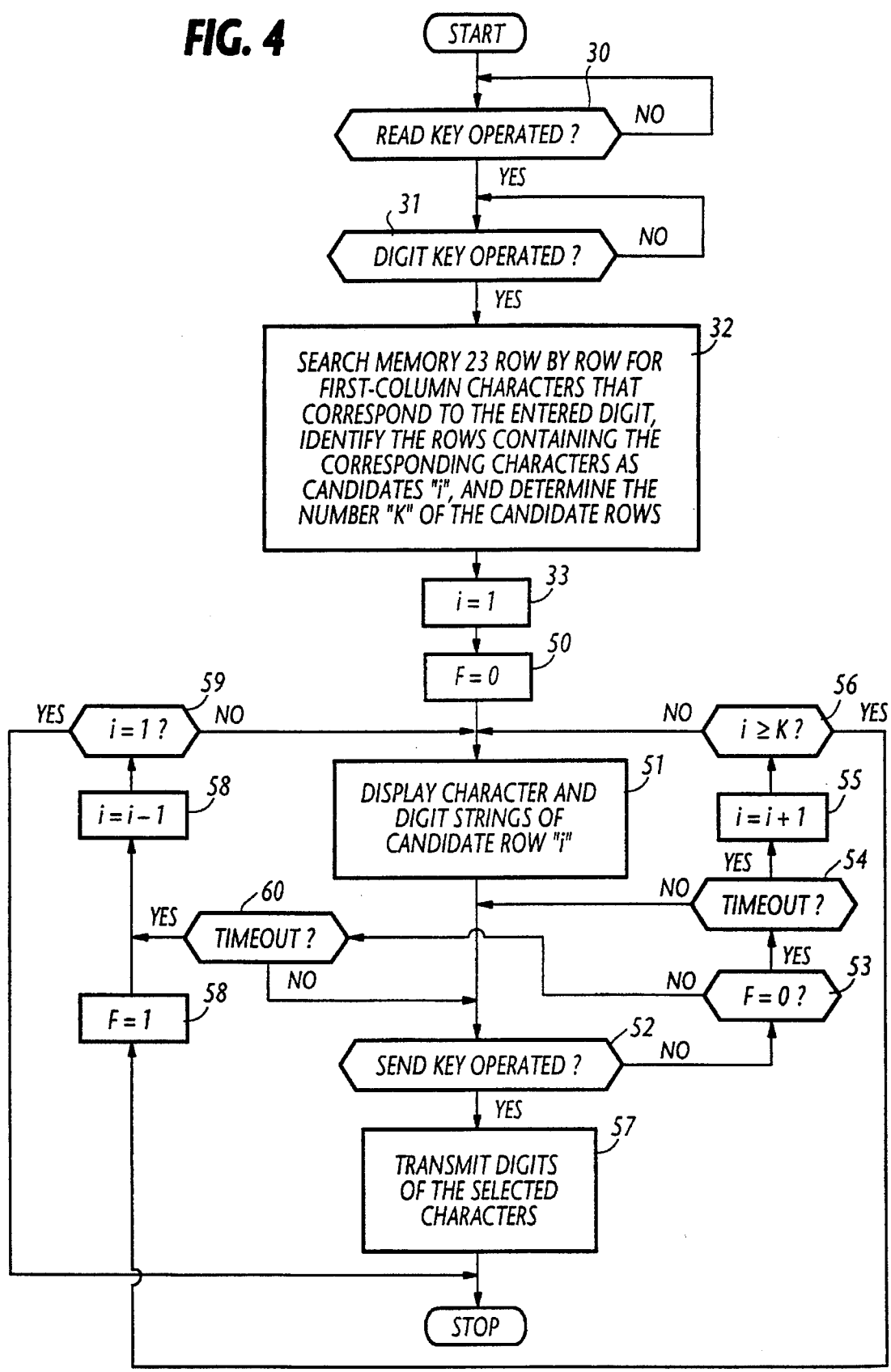

DIALING APPARATUS FOR DISPLAYING STORED CHARACTER WITH REDUCED KEY OPERATIONS

BACKGROUND OF THE INVENTION

1. Field of the Invention

The present invention relates generally to telephone sets, and more specifically to a speed dialing technique for dialing digits with reduced key operations.

2. Description of the Related Art

A conventional speed dialing procedure involves the use of combinations of digit keys assigned uniquely to different characters. By manually entering one of the key combinations, a memory is searched for detecting characters which are stored in the leftmost column of the memory and correspond to the entered key combination. If two or more characters are detected, the next key combination is entered to make a search for those characters stored in the next column. The process is repeated until there is only one remaining character string that contains the detected characters. The remaining character string is then put on display for confirmation by the user before corresponding digits are dialed. One disadvantage of the prior art dialing procedure is that if similar character strings are stored in the memory, the user must repeat key operations a substantial number of times.

SUMMARY OF THE INVENTION

It is therefore an object of the present invention to provide a dialing apparatus for telephone set or the like for dialing stored digits with reduced key operations while displaying characters.

According to the present invention, there is provided a dialing apparatus comprising a keypad having manually operated digit keys each being operated for entering a digit corresponding to a set of characters and a manually operated function key. A plurality of character strings and a plurality of corresponding digit strings are stored in a memory. Each digit string contains a series of digits that constitute a subscriber number. In response to the digit from the keypad, a controller makes a search through the memory for detecting each one of characters of the set which corresponds to the entered digit and detecting character strings each of which contains one of the detected characters. The detected character strings are then sequentially supplied to a display unit from the memory so that they are displayed one at a time to allow the user to confirm and operate the function key if the displayed character string is one that is desired. In response to the operation of the command key, the controller identifies the character string being displayed on the display unit. The digits stored in the memory corresponding to the identified character string are then dialed to a switched network.

BRIEF DESCRIPTION OF THE DRAWINGS

The present invention will be described in further detail with reference to the accompanying drawings, in which:

FIG. 3 is a flowchart representative of the operation of the present invention; and FIG. 4 is a flowchart of a modified embodiment of the invention.

DETAILED DESCRIPTION

Figure 1:
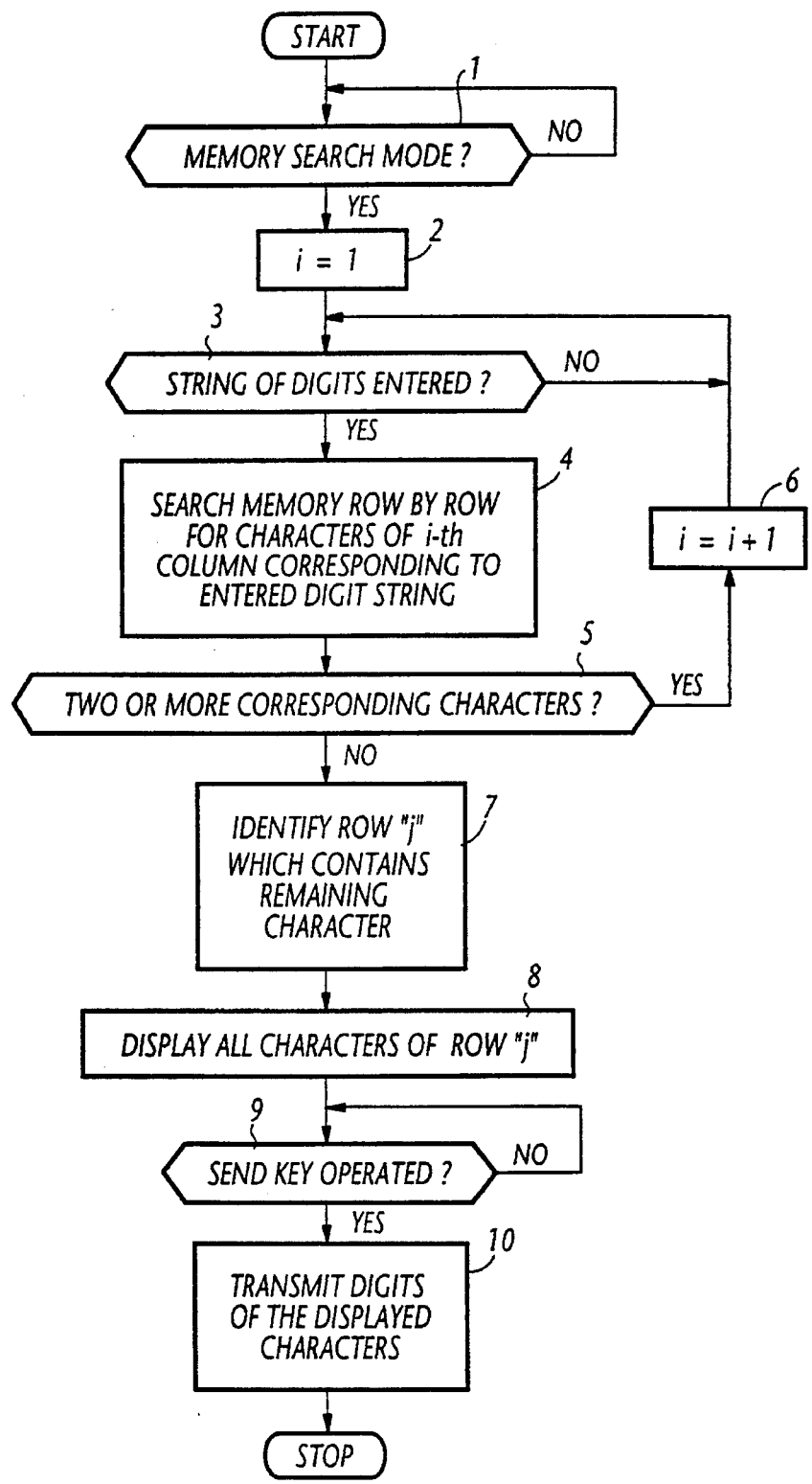
FIG. 1 is a flowchart of a prior art memory search dialing operation.

Prior to the description of the present invention it is appropriate to describe a prior art memory dialing procedure with reference to FIG. 1. During a memory search mode commenced by the operation of a specially assigned key (block 1), control proceeds to block 2 to set variable "i" to 1. Combinations of two digit keys are uniquely assigned to the individual letters of the alphabet, and the user sees a list of such digit combinations and enters a string of digits corresponding to the first letter of the name of a desired destination party. When this occurs, control executes block 3 and branches to block 4 to search through a memory in which character strings are stored in a matrix of rows and columns. The search is made row by row along column "i" so that the characters of this column which correspond to the entered digit string are identified and the rows to which they belong are treated as candidate character strings, or names. Control proceeds to block 5 to determine whether two or more of such candidate character strings exist. If the answer is affirmative, control branches at block 5 to block 6 to increment i by 1 and returns to block 3 to repeat the process until there is only one candidate character string remaining. If this is the case, control branches out to block 7 to identify row "j" in which the remaining character string is stored. All characters of row "j" are then displayed (block 8) and the user is allowed to confirm the displayed name. If the displayed name is what is intended, the user operates a proceed-to-send key (block 9) and the digits of the displayed item are transmitted to the telephone network (block 10). Therefore, if similar names are stored in the memory, the user must perform a substantial number of key operations.

Figure 2:
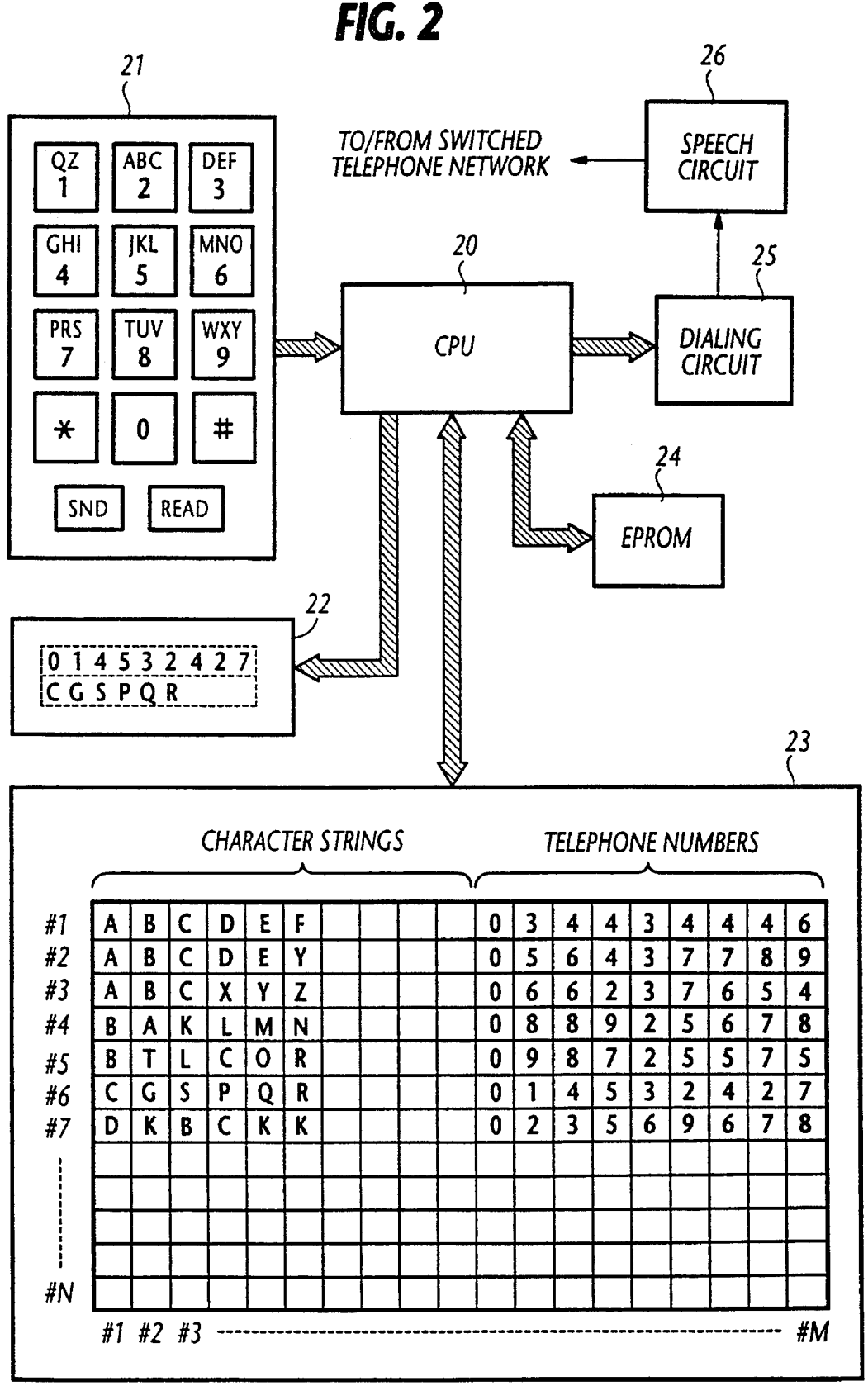
FIG. 2 is a block diagram of a telephone set according to the present invention.

In FIG. 2, a dialing circuit of the present invention is shown as being incorporated in a telephone set. The dialing circuit comprises a central processing unit 20, a keypad 21, a liquid-crystal display unit 22, and an electrically programmable read-only memory (EPROM) 23 for storing character strings and corresponding telephone numbers in a matrix of N rows and M columns. The operating program of the CPU 20 is stored in a second EPROM 24.

The keypad 21 includes ten digit keys, function keys including asterisk (down scroll) and sharp (up scroll) keys, a proceed-to-send key SND and a memory read command key READ which is used to initiate a memory search mode. The display unit 22 has an upper area for displaying a telephone number and a lower area for displaying a destination user name corresponding to the telephone number. Since the number of items to be displayed is limited, only one item is displayed at a time by scrolling the display unit. Numeral digit keys "1" to "9" are labelled with letters of the alphabet as indicated so that digit "1" is assigned a set of two characters and each of the other keys is assigned a set of three characters as illustrated. During the memory search mode, one of these digit keys is used to address the first-column (leftmost column) characters stored in memory 23.

As shown in FIG. 3, CPU 20 performs a sequence of programmed instructions during a memory search mode, starting with decision block 30 which checks to see if the READ key is operated. Exit then is to decision block 31 which determines whether one of digit keys 1 to 9 is depressed. If the answer is affirmative, control branches to block 32 to search through the memory 23 row by row for the first-column characters which correspond to the digit number of the key just operated, and determines the number "K" of rows "i" (where i= 1, 2, ... K) which contain the first-column characters detected as corresponding to the entered digit. Control exits to block 33 to set a variable i to 1 and proceeds to block 34 to read out the character string and digit string of row "i" from the memory 23 and supply them to the display unit 22. The user is thus allowed to confirm the name of the displayed item. If the displayed item is what is desired, the user operates the proceed-to-send key SND, otherwise he operates a scroll-down key. If one of the scroll-down keys is operated (block 35), control branches at block 35 to block 36 to increment variable "i" by one. Variable "i" is then checked against the integer "K" (block 37). If variable i is smaller than K, control branches at block 37 to block 34 to read out the item of the next row from the memory 23 and put them on display. If i=K, control branches out at block 37 to block 39 to decrement variable i by one and proceeds to block 40 to check if i=1. if the answer is negative, control returns to block 34 to repeat the process for the decremented candidate row. The function keys are then checked (block 35) to see if the scroll-up key is operated. If this is the case, control repeats blocks 39 and 40 to continue the down-scroll operation until variable i becomes equal to 1. When this occurs control branches at block 40 and ends the program execution. In this way, stored names having the same characters in the first column are successively displayed each time one of the scroll keys is operated.

Alternatively, the program can be modified to automatically scroll down or up without the scroll key operation as shown in a flowchart of FIG. 4. In this modification, blocks 30 to 33 are identical to those of FIG. 3. Following the initialization of variable i to 1 (block 33), a flag F is initialized to 0 (block 50). Exit then is to block 51 to display the character and digit strings of row "i" and control proceeds to block 52 to check to see if the proceed-to-send key SND is operated. If the answer is negative, control branches to block 53 to determine whether flag F is set to 1. Initially, the answer is negative, and control branches at block 53 to block 54 and goes to block 52 after executing a timeout check step (block 54). Within the timeout period, block 52 is repeatedly checked while the contents of row "i" are being displayed. If the timeout period expires, control branches at block 54 to block 55 to increment i by 1 and checks to see if i≧K. If the answer is negative, blocks 51 through 56 are repeated until variable i is equal to K. When i=K, control branches at block 56 out to block 58 to set flag F to 1 and decrement variable i by 1 (block 58) and makes a check for i=1 in block 59. If the answer is negative, control branches at block 59 to block 51 to display the contents of the decremented candidate row. The proceed-to-send key SND is again checked (block 52). If this key is not operated, control exits to block 53. Since F=1, control branches at block 53 to block 60 to provide a timeout check to allow time for the user to examine the displayed item or the decremented candidate row by repeatedly executing blocks 52, 53 and 60. Upon expiry of the timeout, control exits block 60 to block 58 to decrement i by 1 and makes a check for i=1 in block 59. The down-scroll process is thus continued until i=K, whereupon control exits block 59 and end the program execution.

If the user wants to place a call to a destination, say, "CGSPQR" which is stored in the sixth row of memory 23, the user operates digit key "2". The memory 23 is searched for (block 32) and the character strings having the letters "A", "B" and "C" in the first column of the memory 23 are detected. Thus, the character strings stored in the first to sixth rows of the memory 23 are read and successively put on display. When i=6, a character string "CGSPQR" will appear on the upper area of display unit 22 and the corresponding digit string "078925678" appears on the lower area. The user confirms that the displayed item is what is desired and operates the proceed-to-send key SND to select the displayed item. When this occurs, control branches at block 35 to block 38 to transmit the digits of the selected telephone number "078925678" to the telephone network.

Returning to FIG. 2, the displayed digits are supplied from CPU 20 to a dialing circuit 25 where the digits are converted to a sequence of multi-frequency tone signals in cases where they were to be sent to an analog telephone network or converted to a sequence of AMI (alternate mark inversion) line codes in cases where the signal were to be sent to a digital network, The output of the dialing circuit 25 is then transmitted via a speech circuit 26 to the telephone network.

What is claimed is:

1. A dialing apparatus comprising:

a keypad having manually operated digit keys for entering a digit, each digit key being labelled uniquely with a set of characters, a first manually operated function key for entering a first command signal, and a second manually operated key for entering a second command signal;

a memory for storing a plurality of character strings and a plurality of corresponding digit strings, each of said digit strings containing a plurality of digits that constitute a subscriber number;

a display unit for displaying one of said character strings; and control means responsive to the entered digit from said keypad for making a search through said memory for detecting the characters of the set of characters which are labelled on the digit key of the entered digit, detecting character strings containing the detected characters and causing said display unit to display one of the detected character strings, replacing the displayed character string with another of the detected character strings in response to said first command signal, and identifying digits stored in said memory corresponding to the character string being displayed on said display unit in response to said second command signal as dialing information to be sent to a switched network.

2. A dialing apparatus comprising:

a keypad having manually operated digit keys for entering a digit, each digit key being labelled uniquely with a set of characters, a first manually operated function key for entering a first command signal, and a second manually operated function key for entering a second command signal;

a memory comprising a matrix of rows and columns for storing a plurality of character strings and a plurality of corresponding digit strings along respective rows of the memory, each of said digit strings containing a plurality of digits that constitute a subscriber number;

a display unit for displaying one of said character strings and one of said digit strings corresponding thereto; and control means responsive to the entered digit from said keypad for making a search through said memory row by row along the leftmost column of the memory for detecting the characters of the set of characters which are labelled on the digit key of the entered digit, detecting character strings containing the detected characters and causing said display unit to display one of the detected character strings and the corresponding digit strings, replacing the displayed character string and the corresponding digit strings with a set of another of the detected character strings and another of the digit strings corresponding thereto in response to said first command signal, and transmitting the digits displayed on said display unit in response to said second command signal as dialing information to a switched network.

3. In a telephone apparatus comprising a keypad having manually operated digit keys for entering a digit, each digit key being labelled uniquely with a set of characters, and a first and a second manually operated function key for entering a first and a second command signal, respectively, a memory for storing a plurality of character strings and a plurality of corresponding digit strings, each of said digit strings containing a plurality of digits that constitute a subscriber number, and a display unit for displaying one of said character strings, a method comprising the steps of:

(a) making a search through said memory in response to the entered digit from said keypad;

(b) detecting the characters of the set of characters which are labelled on the digit key of the entered digit and detecting character strings containing the detected characters;

(c) supplying one of the detected character strings to said display unit from said memory and replacing the displayed character string with another of the detected character strings in response to said first command signal;

(d) identifying the character string being displayed on said display unit in response to said second command signal; and (e) dialing the digits which correspond to the character string identified by the step (d) to a switched network.

4. In a dialing apparatus comprising a keypad having manually operated digit keys for entering a digit, each digit key being labelled uniquely with a corresponding set of characters, and a first and a second manually operated function key for entering a first and a second command signal, respectively, a memory comprising a matrix of rows and columns for storing a plurality of character strings and a plurality of corresponding digit strings along respective rows of the memory, each of said digit strings containing a plurality of digits that constitute a subscriber number, and a display unit for displaying one of said character strings and one of said digit strings corresponding thereto, a method comprising the steps of:

(a) making a search through said memory row by row along the leftmost column of the memory in response to the entered digit from said keypad;

(b) detecting the characters of the set of characters which are labeled on the digit key of the entered digit, and detecting character strings containing the detected characters;

(c) supplying one of the detected character strings to said display unit from said memory, and replacing the displayed character string with a set of another of the detected character strings and another of the detected digit strings corresponding thereto in response to said first command signal;

(d) identifying the character string being displayed on said display unit in response to said second command signal; and (e) dialing the digits which correspond to the character string identified by the step (d) to a switched network.

* * * * *